United States Patent Office 3,415,687
Patented Dec. 10, 1968

3,415,687
ELECTRIC CURRENT PRODUCING CELL
George J. Methlie II, Ambler, Pa., assignor, by mesne assignments, to Honeywell Inc., Minneapolis, Minn., a corporation of Delaware
No Drawing. Filed Mar. 29, 1966, Ser. No. 538,209
9 Claims. (Cl. 136—100)

The present invention relates to a novel electric current-producing cell, and to a novel method of generating electric current using the same; and, more particularly, the present invention relates to an improved electric current-producing cell system involving a novel combination of anode and non-aqueous electrolyte which produces advantageous improved results. The invention also relates to a battery comprising two or more of such simple cells.

While water is the solvent employed in conventional cells, cell systems involving the use of certain organic liquids have been suggested, as in U.S. Patents 2,597,451; 2,597,452; 2,597,453; 2,597,454; 2,597,455 and 2,597,456. The use of liquid ammonia has also been disclosed (see for example U.S. Patent 2,863,933). U.S. Patent 2,597,455 discloses a cell system involving a magnesium anode and magnesium perchlorate dissolved in methyl acetate. So far as is known, this cell system never reached commercial significance. Tests with it have shown it gives very poor results probably due to the nature of the anode and electrolyte solute. Another important fact I have found is the nature of the methyl acetate itself, as discussed more in detail below.

The principal object of the present invention is to provide a novel improved electric current producing cell.

Another object of the present invention is to provide an electric current-producing cell employing a non-aqueous solvent and capable of use over a wide temperature range down to well below the freezing point of water.

A further object of the present invention is to provide an electric current-producing cell, employing a highly active anode metal, namely, lithium, capable of providing a good range of temperature performance at substantial drain rates over long periods of time.

These and other objects, including the provision of a novel method of generating electric current, will become apparent from a consideration of the following specification and the claims.

The novel electric current-producing cell of the present invention comprises a lithium metal anode, a depolarizing cathode and, as the electrolyte in contact with said anode and cathode, methyl acetate having less than 0.5 mol percent of impurities, principally methanol, acetic acid and water, there being less than 500 parts per million of water in the electrolyte and having therein anions selected from the group consisting of $MX_4^-$, $MX_6^=$ and $M'F_6^-$ where M is an element selected from the group consisting of boron, aluminum and indium; where M' is an element selected from the group consisting of phosphorous, antimony and arsenic, and where X is a halogen.

The present cell may or may not be of the deferred action type depending upon whether one or more of the elements is held out of contact from the others until the time of activation. In addition, within the upturn of the present invention secondary cells (rechargeable) as well as primary cells can be made. In connection with the freezing the present invention is not concerned with the details of construction of the cell, and the principles of the present invention may be utilized by those skilled in the art to construct any type of current-producing cells—the present invention being based essentially on the use of the above-described combination of anode and electrolyte for electric current-producing cell systems, with a suitable cathode material.

As will be seen from the data hereinafter set forth the cell system of the present invention is capable of providing unusually high voltages for electrochemical cells of the size shown, and is capable of continuing the output at substantial voltage levels for prolonged periods of time. As stated previously, secondary cells can be made according to the present invention.

The solvent for the electrolyte of the present cell system, as stated, will be very pure methyl acetate. Attempts to use commercial solvent grade methyl acetate, and even commercial reagent grade methyl acetate, as the electrolyte solvent in a cell utilizing a lithium anode met with failure. My work with highly pure methyl acetate has led me to the conclusion that the reason for this failure is the presence of certain impurities in the stated commercial materials. The reagent grade methyl acetate contains about 0.5% by weight, of methanol and acetic acid (about 0.9 mol percent where the methanol and acetic acid are present in equal parts by weight) and about 0.1–0.5%, by weight, (about 1000–5000 p.p.m. or about 0.4–2 mol percent) of water. The solvent grade methyl acetate is even higher in these impurities. I have found, however, that if the methyl acetate is highly pure, it provides an unexpectedly good cell system utilizing a lithium anode and an electrolye solute of the type described more in detail hereinafter. The methyl actate used in accordance with the present invention, and hence the electrolyte of the present invention, contains less than 0.5 mol percent of methanol, acetic acid and water (total), there being less than 500 p.p.m. of water present. Preferably, there is less than 150 p.p.m. of water present. High quality chromatographic grade methyl acetate has been found to be particularly suitable in this regard. This material is used as solvent for chromatographic analysis of unknown substances where it is necessary that impurities in the solvent do not appear significantly in the analysis.

The electrolyte solute employed in accordance with the present invention will be a salt or salts which provide at least one of the specific anions, at least substantially non-oxidizing to lithium, $MX_4^-$, $MX_6^=$ and $M'F_6^-$. M in this case is an element selected from the group consisting of boron, aluminum and indium and M' is an element selected from the group consisting of phosphorous, antimony and arsenic. X is a halogen, especialy chlorine, fluorine and bromine. The salt will be sufficiently soluble in methyl acetate to impart electrical conductivity which generally is at least about $10^{-3}$ ohms$^{-1}$ cm.$^{-1}$. While the nature of the cation of the salt is not critical as long as it is also substantially non-oxidizing to lithium and does not detract from the stated requisite solubility of the salt, it is preferably an alkali metal, especially sodium, potassium or lithium, or of an organic base, like morpholine. Examples of suitable salts, having anions $MX_4^-$, are the tetrafluoroborates ($BF_4^-$) tetrachloroborates ($BCl_4^-$), tetrabromoborates ($BBr_4^-$), tetrafluoroaluminates ($AlF_4^-$)

tetrachloroaluminates ($AlCl_4^-$), tetrabromoaluminates ($AlBr_4^-$), tetrafluoroindanates ($InF_4^-$), tetrachloroindanates ($InCl_4^-$) and tetrabromoindanates ($InBr_4^-$). Examples of suitable salts having anions $MX_6^=$ are the hexafluoroaluminates ($AlF_6^=$), the hexachloroaluminates ($AlCl_6^=$)

the hexabromoaluminates ($AlBr_6^=$), the hexafluoroindanates ($InF_6^=$) and the hexachloroindanates ($InCl_6^=$). Examples of suitable salts having anions $M'F_6^-$ are the hexafluorophosphates ($PF_6^-$), the hexafluoroantimonates ($SbF_6^-$)

and the hexafluoroarsenates ($AsF_6^-$). Salts having the anions $MX_4^-$ and $M'F_6^-$ are preferred, as are salts having a lithium cation. Combinations of electrolyte solute salts may be used.

Presently preferred solute salts are: lithium tetrafluoroborate, lithium tetrachloroaluminate, lithium tetrabromoaluminate, lithium tetrachloroindanate, lithium hexafluorophosphate, lithium hexafluoroantimonate and morpholinium hexafluorophosphate.

The solute will be essentially anhydrous so that when it is incorporated in the described methyl acetate solvent, the water content of the resulting electrolyte will be as discussed above.

The concentration of the solute in the defined methyl acetate will be such as to provide electrical conductivity as referred to above. Generally, this will require a concentration of at least about 0.1 molar. The concentration may greatly exceed this, even up to saturation which may reach 5–7 molar with some solutes. The preferred concentration of solute is from about 0.5 to about 5 molar.

The anode will be lithium metal. The lithium may be associated with another metal, such as in alloy form with a less active metal if reduced activity is desired. The lithium, including a lithium alloy, may be in contact with another metal structure, such as a nickel or silver screen, which serves as the anode conductor.

The cathode (which will be a depolarizing cathode) is the site of the reduction reaction and requires a material that is reducible electrochemically (often referred to as the "depolarizer") and a cathode conductor. The cathode material should have a potential (open circuit) at least about 2 volts less than that of lithium.

There is a wide variety of cathode materials (depolarizers) available for use, including heavy metal compounds, transition metal compounds, organic oxidizing agents, cyclic active halogen compounds, positive halogen compounds, halogen addition compounds, inorganic peroxy compounds, free halogens and the like. Examples of heavy metal compounds are: mercuric oxide, mercury (I) chloride, mercury (II) chloride, mercury (II) sulfate, mercury (II) sulfide, lead (II) oxide, lead (IV) oxide, lead (II) chloride, lead (IV) fluoride, lead (II) sulfide, silver (I) chloride, silver (I) oxide, silver (II) oxide, silver (I) fluoride, silver (II) fluoride, bismuth trioxide, bismuth pentoxide, bismuth trichloride, thallium chloride, gold (III) chloride, and the like. Examples of transition metal compounds are: copper (I) chloride, copper (II) chloride, copper (I) fluoride, copper (II) fluoride, copper (II) sulfide, manganese dioxide, manganese (III) fluoride, vanadium (V) oxide, chromium (II) chloride, chromium (II) fluoride, chromium trifluoride, chromium trioxide, cobalt (III) fluoride, nickel (II) chloride, nickel (II) fluoride, nickel (IV) oxide, and the like. Examples of organic oxidizing agents are: the nitro and nitroso aromatic compounds disclosed in U.S. Patent 3,235,408, especially the dinitrobenzenes, like ortho dinitrobenzene, phenyl mercuric nitrate; quinones, like anthraquinone; N-bromoacetamide, and the like. Examples of cyclic active halogen compounds are trichloromelamine, hexachloromelamine, potassium dichloroisocyanurate, and the like. Examples of positive halogen compounds are iodoxy benzene, iodine pentoxide, potassium periodate, and the like. Tetramethyl ammonium chloride·Br$_2$ and pyridinium bromide·Br$_2$ are examples of halogen addition compounds, and iodine and bromine are examples of free halogens. Examples of inorganic peroxy compounds are: potassium permanganate, potassium dichromate, ammonium persulfate, and the like.

Presently preferred cathode materials are silver (I) chloride, silver (I) fluoride, silver (II) oxide, copper (I) chloride, copper (II) chloride, copper (II) fluoride, manganese dioxide, bismuth trioxide and potassium dichloroisocyanurate. Silver (I) chloride is especially preferred in providing a secondary (rechargeable) system.

The cathode material is advantageously mixed with a finely-divided conductive material, like carbon black or nickel flake, to render the mixture conductive. In addition, materials like paper fibers, asbestos fibers and cellulose acetate may be incorporated in the mixture to act as binders.

A suitable cathode conductor may be prepared from carbon, silver, copper, platinum, nickel or any other electrically conductive material inert to the electrolyte in contact therewith.

As will be apparent to those skilled in the art, two or more cells may be associated and connected together electrically to provide a battery.

To keep the anode and cathode out of direct electrical contact, a suitable separator may be inserted between them. The separator will be inert to the electrolyte and will be structurally at least sufficiently porous to permit the flow of ions between the anode and cathode. Suitable separator materials are porous sheeting of non-woven nylon fibers bonded with a butadiene-acrylonitrile copolymer and open, porous sheets or screens of polypropylene.

In activating the cell, and generating current with it, the defined electrolyte is brought into contact with the anode and cathode, the anode and cathode being connected to an external circuit for current to flow.

The invention will be more readily understood from a consideration of the following specific examples which are given for the purpose of illustration and are not intended to limit the scope of the invention in any way.

Example I

Ribbons of lithium metal ($\frac{1}{16}$" thick) are pressed into expanded nickel screens (approximately 625 openings per square inch), and a square 1½" x 1½" is cut therefrom. A strip of nickel screen is attached near one corner of the square to serve as a lead. This asembly is employed as anode.

A cathode is prepared by mixing 1 gram of $Bi_2O_3$ with 0.25 gram of air floated graphite, making a paste of the mixture with high quality chromatographic grade methyl acetate (less than 0.5 mol of methanol, acetic acid and water, the water being less than 500 p.p.m.) and pressing the paste into the 1½" x 1½" foot of an L-shaped piece of fine, expanded silver screen. The leg of the L-shaped piece serves as a lead.

A separator is prepared by cutting a 1½" x 1½" square from a porous unwoven sheet (about 20 mils thick) of nylon fibers bonded with polyacrylonitrile-butadiene copolymer.

A sandwich of anode-separator-cathode is inserted into a small polyethylene bag of a size adapted to receive the sandwich but to hold it firmly together. The bag is then heat sealed with the leads protruding, and the leads are connected into a circuit including a voltmeter.

The cell is activated by injecting into the bag (by means of a hypodermic syringe) about 8 cc. of a 2 molar solution of lithium tetrafluoroborate ($LiBF_4$) in the defined methyl acetate.

With the cell operating at room temperature, the open circuit voltage is noted. A decade resistance box, adjustable from 10 to 10,000 ohms is then connected and the voltage noted at various resistance levels.

The results are as follows:

| Resistance (ohms) | Voltage (volts) | Current (ma.) | Current Density (ma./cm.$^2$) |
|---|---|---|---|
| (open circuit) | 3.38 | | |
| 10,000 | 3.31 | 0.3 | .02 |
| 5,000 | 3.24 | 0.6 | .04 |
| 1,000 | 3.01 | 3 | .2 |
| 500 | 2.92 | 6.8 | .4 |
| 220 | 2.78 | 12.6 | .9 |
| 100 | 2.55 | 25.5 | 1.77 |
| 50 | 2.30 | 46 | 3.2 |
| 40 | 2.20 | 55 | 3.8 |
| 30 | 2.07 | 69 | 4.8 |
| 20 | 1.89 | 95 | 6.5 |
| 10 | 1.55 | 155 | 10.7 |
| 1 | .50 | 500 | 34.4 |

Example 2

The procedure of Example 1 is followed except that 1 gram chromium trioxide ($CrO_3$) is used in preparing the cathode, instead of $Bi_2O_3$ with 0.85 gram of graphite. The results are as follows:

| Resistance (ohms) | Voltage (volts) | Current (ma.) | Current Density (ma./cm.$^2$) |
|---|---|---|---|
| (open circuit) | 3.68 | | |
| 10,000 | 3.68 | .37 | .025 |
| 5,000 | 3.67 | .74 | .05 |
| 1,000 | 3.57 | 3.6 | .25 |
| 500 | 3.40 | 6.8 | .47 |
| 220 | 3.12 | 14.2 | .78 |
| 100 | 2.65 | 26.5 | 1.82 |
| 50 | 2.20 | 44 | 3 |
| 40 | 2.15 | 54 | 3.7 |
| 30 | 2.00 | 67 | 4.6 |
| 20 | 1.65 | 82 | 8.7 |
| 10 | 1.15 | 115 | 17.2 |

Example 3

The procedure of Example 1 is followed except that 1 gram of manganese dioxide ($MnO_2$) is used in preparing the cathode, in place of $Bi_2O_3$, along with 0.45 gram of graphite.
The results are as follows:

| Resistance (ohms) | Voltage (volts) | Current (ma.) | Current Density (ma./cm.$^2$) |
|---|---|---|---|
| (open circuit) | 3.85 | | |
| 10,000 | 3.84 | .38 | .026 |
| 5,000 | 3.83 | .76 | .052 |
| 1,000 | 3.79 | 3.8 | .26 |
| 500 | 3.74 | 7.4 | .52 |
| 220 | 3.64 | 16.5 | 1.14 |
| 100 | 3.48 | 34.8 | 2.4 |
| 50 | 3.27 | 65 | 4.5 |
| 40 | 3.20 | 80 | 5.5 |
| 30 | 3.07 | 103 | 7.1 |
| 20 | 2.82 | 141 | 9.7 |
| 10 | 2.32 | 232 | 16 |

Example 4

The procedure of Example 1 is followed except that 1 gram of silver (II) oxide ($Ag_2O_2$) is used in preparing the cathode, in place of $Bi_2O_3$, along with 0.3 gram of graphite.
The results are as follows:

| Resistance (ohms) | Voltage (volts) | Current (ma.) | Current Density (ma./cm.$^2$) |
|---|---|---|---|
| (open circuit) | 3.75 | | |
| 10,000 | 3.72 | .37 | .026 |
| 5,000 | 3.72 | .74 | .052 |
| 1,000 | 3.67 | 3.7 | .26 |
| 500 | 3.60 | 7.2 | .52 |
| 220 | 3.48 | 15.8 | 1.1 |
| 100 | 3.28 | 32.8 | 2.3 |
| 50 | 3.00 | 60 | 4.2 |
| 40 | 2.90 | 72.5 | 5 |
| 30 | 2.71 | 90 | 6.2 |
| 20 | 2.44 | 122 | 8.4 |
| 10 | 2.00 | 200 | 13.8 |

Example 5

The procedure of Example 3 is followed except that the electrolyte is a 0.63 molar solution of lithium tetrachloroaluminate ($LiAlCl_4$) in said methyl acetate.
The results are as follows:

| Resistance (ohms) | Voltage (volts) | Current (ma.) | Current Density (ma./cm.$^2$) |
|---|---|---|---|
| (open circuit) | 3.75 | | |
| 10,000 | 3.75 | .38 | .026 |
| 5,000 | 3.77 | .76 | .052 |
| 1,000 | 3.73 | 3.7 | .26 |
| 500 | 3.65 | 7.3 | .52 |
| 220 | 3.46 | 15.8 | 1.09 |
| 100 | 2.90 | 29 | 2.00 |
| 50 | 2.40 | 48 | 3.30 |
| 40 | 2.19 | 55 | 3.80 |
| 30 | 1.95 | 65 | 4.50 |
| 20 | 1.60 | 80 | 5.51 |
| 10 | 1.20 | 120 | 8.29 |

Examples 6–41

Other cells are made in the same manner as Example 1 varying the electrolyte solute and/or cathode material, and their electrical characteristics are measured. To avoid unnecessary repetition, these cells are listed below as to electrolyte solute (and concentration thereof) and cathode material. In preparing the cathodes, 1 gram of the stated cathode material is used and an equal volume of graphite is mixed therewith. Only the open circuit voltage (O.C.V.) is set forth:

| Ex. | Electrolyte Solute | Cathode Material | O.C.V. (volts) |
|---|---|---|---|
| 6 | Morpholinium hexafluorophosphate (1.5 M). | Potassium dichloroisocyanurate. | 3.75 |
| 7 | $LiAlCl_4$ (0.63 M) | do | 3.28 |
| 8 | $LiAlCl_4$ (0.63 M) | $(NH_4)_2S_2O_8$ | 3.00 |
| 9 | $LiAlCl_4$ (0.63 M) | $Bi_2O_3$ | 2.85 |
| 10 | $LiAlCl_4$ (1 M) | $HgCl_2$ | 3.07 |
| 11 | $LiAlCl_4$ (1 M) | $Ni_2O_3$ | 2.20 |
| 12 | $LiBF_4$ (2 M) | $MnF_3$ | 3.90 |
| 13 | $LiBF_4$ (2 M) | $CuF_2$ | 3.20 |
| 14 | $LiBF_4$ (2 M) | $NiF_2$ | 3.0 |
| 15 | $LiBF_4$ (2 M) | $CoF_3$ | 3.68 |
| 16 | $LiAlCl_4$ (1 M) | CuCl | 2.95 |
| 17 | $LiAlCl_4$ (1 M) | $CuCl_2$ | 3.35 |
| 18 | $LiBF_4$ (2 M) | CuS | 3.65 |
| 19 | $NaBF_4$ (1 M) | CuS | 3.95 |
| 20 | $LiAlCl_4$ (1 M) | AgCl* | 2.72 |
| 21 | $LiBF_4$ (2 M) | AgF | 3.72 |
| 22 | Morpholinium hexafluorophosphate (1 M). | AgF | 2.81 |
| 23 | $LiPF_6$ (1.5 M) | $Ag_2O_2$ | 3.64 |
| 24 | $LiAlCl_4$ (0.63 M) | $Ag_2O_2$ | 3.08 |
| 25 | $LiBF_4$ (2 M) | $Ag_2O_2$ | 3.75 |
| 26 | $LiAlCl_4$ (2 M) | $PbCl_2$ | 2.87 |
| 27 | $LiAlCl_4$ (1 M) | HgCl | 2.82 |
| 28 | $LiAlCl_4$ (1 M) | $PbO_2$ | 2.78 |
| 29 | $LiBF_4$ (2 M) | HgO | 3.20 |
| 30 | $LiPF_6$ (0.5 M) | Anthraquinone | 3.45 |
| 31 | $LiAlF_4$ (1 M) | do | 3.04 |
| 32 | $LiAlCl_4$ (.63 M) | $CrO_3$ | 3.68 |
| 33 | $KAlBr_4$ (0.63 M) | $I_2$ | 2.95 |
| 34 | $NaPF_6$ (1.5 M) | Potasssium dichloroisocyanurate. | 3.62 |
| 35 | $LiAlCl_4$ | Trichloromelamine | 2.92 |
| 36 | $LiAlCl_4$ (1 M) | o-Dinitrobenzene | 2.78 |
| 37 | $LiBF_4$ (2 M) | Phenyl mercuric nitrate. | 3.01 |
| 38 | $LiBF_4$ (2 M) | $I_2O_5$ | 2.55 |
| 39 | $LiBF_4$ (2 M) | $KIO_4$ | 3.40 |
| 40 | $LiBF_4$ (2 M) | $KMnO_4$ | 3.74 |
| 41 | $LiBF_4$ (2 M) | $K_2Cr_2O_7$ | 3.72 |

*Prepared by dipping silver sheet in 1N HCl at 85° C. and anodizing for about 40 minutes on each side to convert surfaces to silver chloride.

Examples 42–45

Other cells are made in the same manner as in Example 1 except for the electrolyte solute which is noted in the table below, and except that the cathode is AgCl and is prepared as follows: a thin paste of silver oxide in water is painted onto a fine silver screen 3" x 4"; a flame is applied to both sides of the painted screen to reduce the silver oxide to metallic silver; the silver coated screen is made the positive electrode in an electroplating bath consisting of 1 N HCl heated to about 85° C.; a silver sheet negative electrode is provided; at a current density of 4 ma./cm.$^2$ the coated screen is anodized for 40 minutes to convert silver in the coating on one side to silver chloride, turned and anodized for 40 minutes to form silver chloride on the other side; the silver chloride-coated screen is cut to 1½" x 1½", and a strip of silver screen is stapled near one corner to serve as a lead:

| Ex. | Electrolyte Solute | O.C.V. (volts) |
|---|---|---|
| 42 | $LiAlCl_4$ (1 M) | 2.80 |
| 43 | $LiAlBr_4$ (1.5 M) | 2.40 |
| 44 | $LiSbF_6$ (1 M) | 3.0 |
| 45 | $LiInCl_4$ (0.63 M) | 3.0 |

Examples 46–47

Cells are made as in Examples 42–45, except that the separator employed is a coarse polyethylene screen about 0.05" thick, using $LiAlCl_4$ as electrolyte solute:

| Ex. | Electrolyte Solute | O.C.V. (volts) |
|---|---|---|
| 46 | $LiAlCl_4$ (1 M) | 2.95 |
| 47 | $LiAlCl_4$ (1.5 M) | 2.81 |

Example 48

A battery of cells, essentially the same as the above cells but of somewhat different structure, is prepared as follows: anodes are prepared as in Example 1 but are cut to discs 2.4" in diameter and a center hole ⁵⁄₁₆" in diameter is cut into each anode disc; separators are the same as in Example 1 but are cut to 2.4" discs and provided with a center hole ⁵⁄₁₆" in diameter; cathodes are prepared as in Examples 42–45 but are cut as 2.4" discs and provided with a center hole ⁵⁄₁₆" in diameter. A stack is made in the following ascending order: anode-separator-cathode-separator-anode - anode - separator - cathode-separator-anode; and the anode leads are connected to a common lead and the cathode leads are connected to another common lead; the stack is placed in a polypropylene container provided with hermetic seals for the leads and an opening for permitting electrolyte to enter: the resulting assembly is placed in a sealed steel container (provided with a valved conduit for introducing electrolyte) with the leads connected in a circuit having a variable resistance and measuring devices; the battery is cooled to —55° C., and is activated by flowing a 0.63 M solution of $LiAlCl_4$ in the described methyl acetate into the steel container and into the polypropylene container.

Electrical characteristics at —55° C., are measured at various resistance levels for various durations of time as noted below. The results are as follows:

| Resistance (ohms) | Voltage (volts) | Duration (secs.) |
|---|---|---|
| (open circuit) | 2.6 | |
| 200 | 2.34 | 60 |
| 100 | 2.38 | 5 |
| 40 | 2.18 | 0.5 |
| 20 | 2.0 | 10 |
| 15 | 1.80 | 5 |
| 10 | 1.84 | 3.1 |
| 4 | 1.6 | 0.2 |

The battery is held at —55° C., at open circuit for 24 hours and the foregoing measurements repeated with the following results:

| Resistance (ohms) | Voltage (volts) | Duration (secs.) |
|---|---|---|
| (open circuit) | 2.45 | |
| 200 | 2.22 | 60 |
| 100 | 2.2 | 5 |
| 40 | 1.92 | 0.5 |
| 20 | 1.7 | 10 |
| 15 | 1.3 | 5 |
| 10 | 1.3 | 3.1 |
| 4 | 1.0 | 0.2 |

The battery is again held at —55° C., at open circuit for another 24 hours and the foregoing measurement sequence is repeated seven times at the same resistance levels and durations as set forth above. The results during the seventh sequence (the ninth following activation) are as follows:

| Resistance (ohms) | Voltage (volts) | Duration (secs.) |
|---|---|---|
| (open circuit) | 2.45 | |
| 200 | 2.2 | 60 |
| 100 | 1.9 | 5 |
| 40 | 1.7 | 0.5 |
| 20 | 1.6 | 10 |
| 15 | 1.6 | 5 |
| 10 | 1.3 | 3.1 |
| 4 | 1.0 | 0.2 |

Example 49

A battery of cells, the same as in Example 48, is subjected to the same series of measurements but at 74° C., instead of —55° C. The high quality chromatographic grade methyl acetate contained less than 150 p.p.m. of water.

Immediately after activation the results are as follows:

| Resistance (ohms) | Voltage (volts) | Duration (secs.) |
|---|---|---|
| (open circuit) | 2.52 | |
| 200 | 2.4 | 60 |
| 100 | 2.4 | 5 |
| 40 | 2.3 | 0.5 |
| 20 | 1.6 | 10 |
| 15 | 1.6 | 5 |
| 10 | 1.3 | 3.1 |
| 4 | 1.0 | 0.2 |

After standing for 25 hours at 74°C., at open circuit, the results are as follows:

| Resistance (ohms) | Voltage (volts) | Duration (secs.) |
|---|---|---|
| (open circuit) | 2.52 | |
| 200 | 2.5 | 60 |
| 100 | 2.5 | 5 |
| 40 | 2.4 | 0.5 |
| 20 | 2.2 | 10 |
| 15 | 1.9 | 5 |
| 10 | 2.0 | 3.1 |
| 4 | 1.77 | 0.2 |

The sequence is repeated seven more time at 74°C., and the results during the seventh (the ninth following activation) are as follows:

| Resistance (ohms) | Voltage (volts) | Duration (secs.) |
|---|---|---|
| (open circuit) | 2.58 | |
| 200 | 2.5 | 60 |
| 100 | 2.4 | 5 |
| 40 | 2.25 | 0.5 |
| 20 | 2.0 | 10 |
| 15 | 1.78 | 5 |
| 10 | 1.76 | 3.1 |
| 4 | 1.4 | 0.2 |

Data for typical cells of the foregoing examples are set forth below showing the duration of discharge under a load of 220 ohms (unless otherwise noted) to various voltage levels:

| Ex. | Discharge time in hours to volts | | | | |
|---|---|---|---|---|---|
| | 2.5 | 2.0 | 1.5 | 1.0 | 0.5 |
| 1 | 0.5 | | 8 | 14 | 24 |
| 3 | 3 | 4 | 10 | 19 | 30 |
| 5 | 1 | 2 | 4 | 5.5 | 14 |
| 6 | 3 | 12 | 18 | 33 | |
| 7* | 0 | 1 | 1.5 | 2.5 | 4.5 |
| 10 | 2 | 5 | 6 | 13 | 23 |
| 11 | 0 | 0 | 4 | 12 | 21 |
| 13 | 4.5 | 10 | 21 | 42 | 50+ |
| 14 | 0 | 2 | 21 | 28 | 35 |
| 15 | 0 | | 9 | 48 | |
| 18 | 1 | 2.5 | 5.5 | 13.5 | |
| 20 | 5 | | 15 | 17 | |
| 24* | 0 | 0 | 2 | 5 | 8 |
| 25 | 6 | 10 | 15 | 19 | 24 |
| 26 | 0 | 10 | 18 | 27 | |
| 27 | 0 | 1 | 2 | 6 | 11 |
| 29 | 1 | 5 | 12 | 15 | 31 |
| 32* | 1.5 | 2.5 | 3 | 4 | 5.5 |
| 34 | 8 | 13 | 16 | 18.5 | |
| 36 | 0 | 5 | 20 | | |
| 37 | 0.5 | 4 | 10 | 16 | |
| 38 | 0.5 | 2 | 3.5 | 6 | |
| 39 | 2.5 | 6 | 8 | 12.5 | 21 |
| 30 | 0 | 1 | 5.5 | 14 | |
| 41 | 0.5 | 0.75 | 1 | 4 | |
| 42 | 5 | | 15 | 17 | |
| 43 | 0 | 9 | 15 | 21 | 26 |
| 44 | 0 | 7.5 | 9 | 30+ | |
| 45 | | 1 | 3.5 | 3.5 | 10 |

*Load of 100 ohms.

The cell of Example 42, after essentially complete discharge, is recharged for about 3 hours at a constant 3.1 volts, and then discharged substantially completely again. The cell is again recharged for about 6 hours, and discharged a third time. On this discharge, the open circuit voltage is 3.15 volts and the discharge data at 220 ohms are as follows:

| Discharge Time in Hours to Volts | | | | |
|---|---|---|---|---|
| 2.5 | 2.0 | 1.5 | 1.0 | 0.5 |
| 2 | 5 | 7 | 9.5 | 13.5 |

By way of contrasting the present cell system from Mg/MgClO$_4$, even in the extremely pure methyl acetate used in the foregoing examples, a cell is prepared as in Examples 42–45 except that magnesium metal is used for preparing the anode and the electrolyte is the described methyl acetate saturated with magnesium perchlorate (less than 0.6 M). The open circuit voltage was only 0.74. Upon discharge under 220 ohm load the voltage was never over 0.19 volt.

Examples 49–50

Cells are made as in Examples 42–45 except for the electrolyte solute which is noted in the table below.

| Ex. | Electrolyte Solute | O.C.V. (volts) |
|---|---|---|
| 49 | Li$_3$InCl$_6$ (1 M) | 2.70 |
| 50 | Na$_3$AlF$_6$ (0.6 M) | 2.85 |

Modification is possible in the selection of specific combinations of materials and in techniques of preparing cells embodying the present teachings without departing from the scope of the invention.

What is climed is:

1. An electric current-producing cell comprising a lithium metal anode, a depolarizing cathode, and, as the electrolyte in contact with said anode and cathode, methyl acetate having therein less than 0.5 mol percent of methanol, acetic acid and water, there being less than 500 parts per million of water in said electrolyte, and having therein anions selected from the group consisting of MX$_4^-$, MX$_6^=$ and M'F$_6^-$ where M is an element selected from the group consisting of boron, aluminum and indium, where M' is an element selected from the group consisting of phosphorous, antimony and arsenic, and where X is halogen.

2. The cell of claim 1 wherein said anions are provided by a salt substantially non-oxidizing to lithium, present in an amount to impart an electrical conductivity of at least about 10$^{-3}$ ohms$^{-1}$ cm.$^{-1}$.

3. The cell of claim 2 wherein the concentration of said salt in said methyl acetate is at least 0.1 molar.

4. The cell of claim 3 wherein the concentration of said salt in said methyl acetate is at least about 0.5 molar.

5. The cell of claim 1 wherein said electrolyte contains less than 150 parts per million of water.

6. The cell of claim 1 wherein X is selected from the group consisting of fluorine, bromine and chlorine.

7. The cell of claim 6 wherein said anion is MX$_4^-$.

8. The cell of claim 6 wherein said anion is M'F$_6^-$.

9. The cell of claim 2 wherein the salt is selected from the group consisting of lithium tetrafluoroborate, lithium tetrachloroaluminate, lithium tetrabromoaluminate, lithium tetrachloroindanate, morpholinium hexafluorophosphate, lithium hexafluorophosphate, and lithium hexafluoroantimonate.

References Cited

UNITED STATES PATENTS

| | | | |
|---|---|---|---|
| 2,597,451 | 5/1952 | Coleman et al. | 136—100 |
| 2,597,455 | 5/1952 | Coleman et al. | 136—100 |
| 3,073,884 | 1/1963 | Pinkerton | 136—100 |
| 3,235,408 | 2/1966 | Harris | 136—90 |

WINSTON A. DOUGLAS, *Primary Examiner.*

A. SKAPARS, *Assistant Examiner.*

U.S. Cl. X.R.

136—83, 90, 155